United States Patent
Salman et al.

(10) Patent No.: US 11,467,300 B2
(45) Date of Patent: Oct. 11, 2022

(54) MULTI-SCALE DEEP NETWORK FOR FAULT DETECTION

(71) Applicant: SCHLUMBERGER TECHNOLOGY CORPORATION, Sugar Land, TX (US)

(72) Inventors: Nader Salman, Arlington, MA (US); Pål Kjetil Kvamme, Randaberg (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 926 days.

(21) Appl. No.: 16/321,030

(22) PCT Filed: Aug. 3, 2017

(86) PCT No.: PCT/US2017/045231
§ 371 (c)(1),
(2) Date: Jan. 27, 2019

(87) PCT Pub. No.: WO2018/026995
PCT Pub. Date: Feb. 8, 2018

(65) Prior Publication Data
US 2019/0162868 A1    May 30, 2019

Related U.S. Application Data

(60) Provisional application No. 62/370,415, filed on Aug. 3, 2016.

(51) Int. Cl.
*G01V 1/30* (2006.01)
*G01V 1/48* (2006.01)
(Continued)

(52) U.S. Cl.
CPC .................. *G01V 1/30* (2013.01); *G01V 1/28* (2013.01); *G01V 1/302* (2013.01); *G01V 1/48* (2013.01);
(Continued)

(58) Field of Classification Search
CPC . G01V 1/30; G01V 1/28; G01V 1/302; G01V 1/48; G01V 1/52; G01V 2210/61;
(Continued)

(56) References Cited

U.S. PATENT DOCUMENTS 6,735,526 B1    5/2004  Meldahl et al.
2010/0161232 A1 6/2010  Chen et al.
(Continued)

FOREIGN PATENT DOCUMENTS

| GB | 2400664 A | 10/2004 |
|---|---|---|
| WO | 0016125 A1 | 3/2000 |
| WO | 2015017796 A2 | 2/2015 |

OTHER PUBLICATIONS

Wang et al., Automatic Fault Surface Detection by Using 3D Hough Transform, 2014 SEG Denver 2014 Annual Meeting, pp. 1439-1444 (Year: 2014).*

(Continued)

*Primary Examiner* — Toan M Le

(57) ABSTRACT

A method for detecting an unknown fault in a target seismic volume. The method includes generating a number of patches from a training seismic volume that is separate from the target seismic volume, where a patch includes a set of training areas, generating a label for assigning to the patch, where the label represents a subset, of the set of training areas, intersected by a known fault specified by a user in the training seismic volume, training, during a training phase and based at least on the label and the training seismic volume, a machine learning model, and generating, by applying the machine learning model to the target seismic volume during a prediction phase subsequent to the training phase, a result to identify the unknown fault in the target seismic volume.

15 Claims, 8 Drawing Sheets

(51) Int. Cl.
G01V 1/52 (2006.01)
G01V 1/28 (2006.01)
G06N 3/04 (2006.01)

(52) U.S. Cl.
CPC .............. *G01V 1/52* (2013.01); *G06N 3/0454* (2013.01); *G01V 2210/61* (2013.01); *G01V 2210/642* (2013.01); *G06T 2207/20081* (2013.01)

(58) Field of Classification Search
CPC ............ G01V 2210/642; G06N 3/0454; G06T 2207/20081
See application file for complete search history.

(56) References Cited

U.S. PATENT DOCUMENTS

| | | |
|---|---|---|
| 2013/0151161 A1 | 6/2013 | Imhof et al. |
| 2013/0226968 A1 | 8/2013 | Wagner et al. |
| 2014/0121980 A1 | 5/2014 | Garcia Leiceaga et al. |

OTHER PUBLICATIONS

Bertasius, et al, "DeepEdge: A Multi-Scale Bifurcated Deep Network for Top-Down Contour Detection", Computer Vision and Pattern Recognition, 2015.

Krizhevsky, et al., "ImageNet Classification with Deep Convolutional Neural Networks", Advances in Neural Information Processing 25, MIT Press, 2012.

Shen, et al., "DeepContour: A Deep Convolutional Feature Learned by Positive-sharing Loss for Contour Detection", Computer Vision and Pattern Recognition, 2015.

Srivastava, et al., "Dropout: A simple way to prevent neural networks from over fitting", Journal of Machine Learning Research, vol. 15, pp. 1929-1958, 2014.

Zhang, et al., "Machine-learning Based Automated Fault Detection in Seismic Traces", Proceedings of 76th European Association of Geoscientists and Engineers Conference & Exhibition (EAGE), 2014.

Zhang, et al., "Structured Output Learning for Automatic Geophysical Feature Detection", ICML Workshop on Features and Structures, 2015.

Zhao, et al., "Saliency Detection by Multi-Context Deep Learning", Computer Vision and Pattern Recognition, 2015.

International Search Report and Written Opinion for the equivalent International patent application PCT/US2017/045231 dated Nov. 15, 2017.

Chehrazi et al., "Seismic data conditioning and neural network-based attribute selection for enhanced fault detection," Petroleum Science, Published Online First on Apr. 2, 2013, pp. 169-183, vol. 19.

Zheng et al., "Multi-Attributes and Neural Network-Based Fault Detection in 3D Seismic Interpretation," Advanced Materials Research vols. 838-841, pp. 1497-1502; Online Novembers, 2013.

Extended Search Report dated May 19, 2020 in the equivalent European Patent Application No. 17837657.0, 8 pages.

* cited by examiner

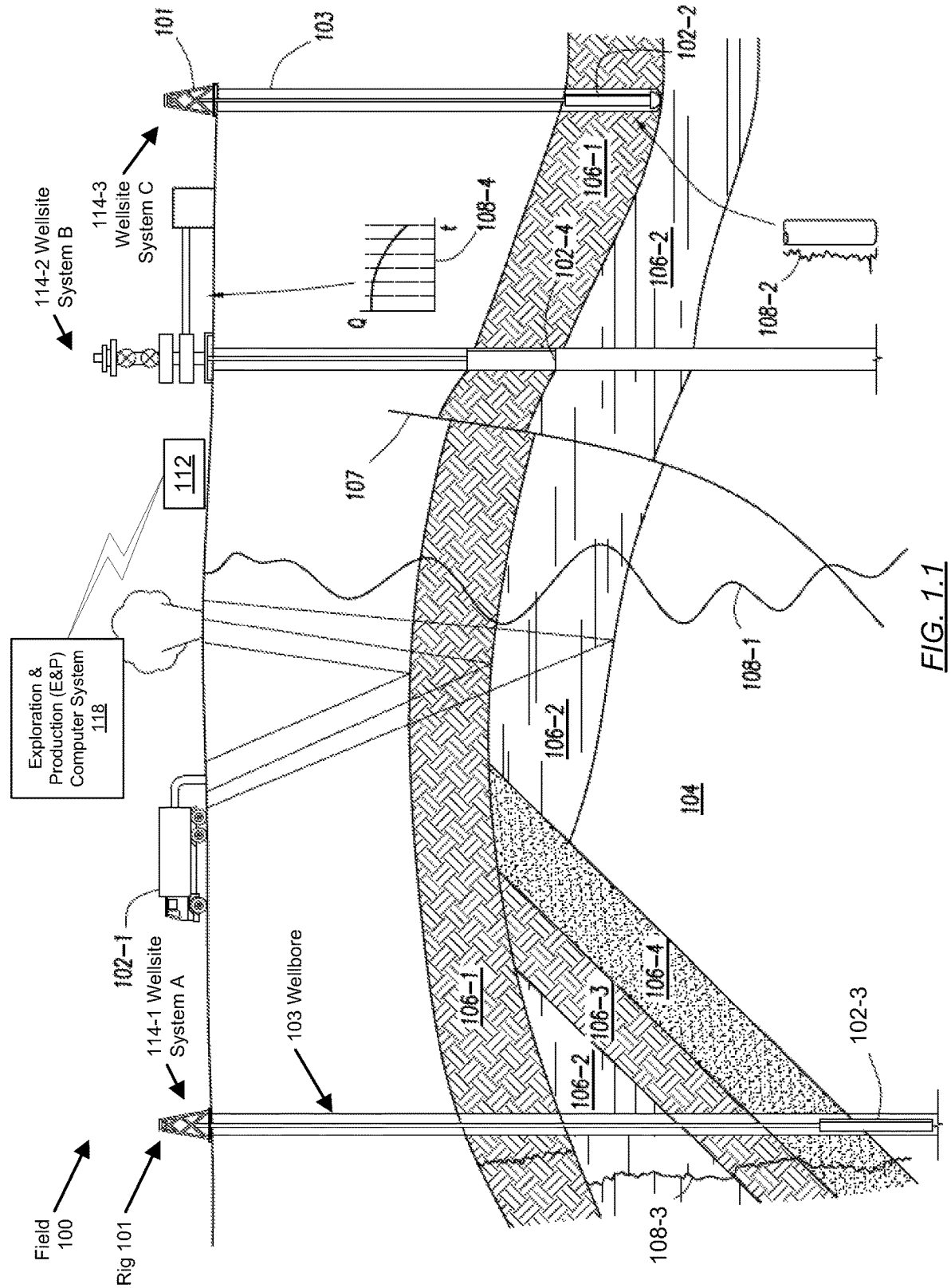
FIG. 1.1

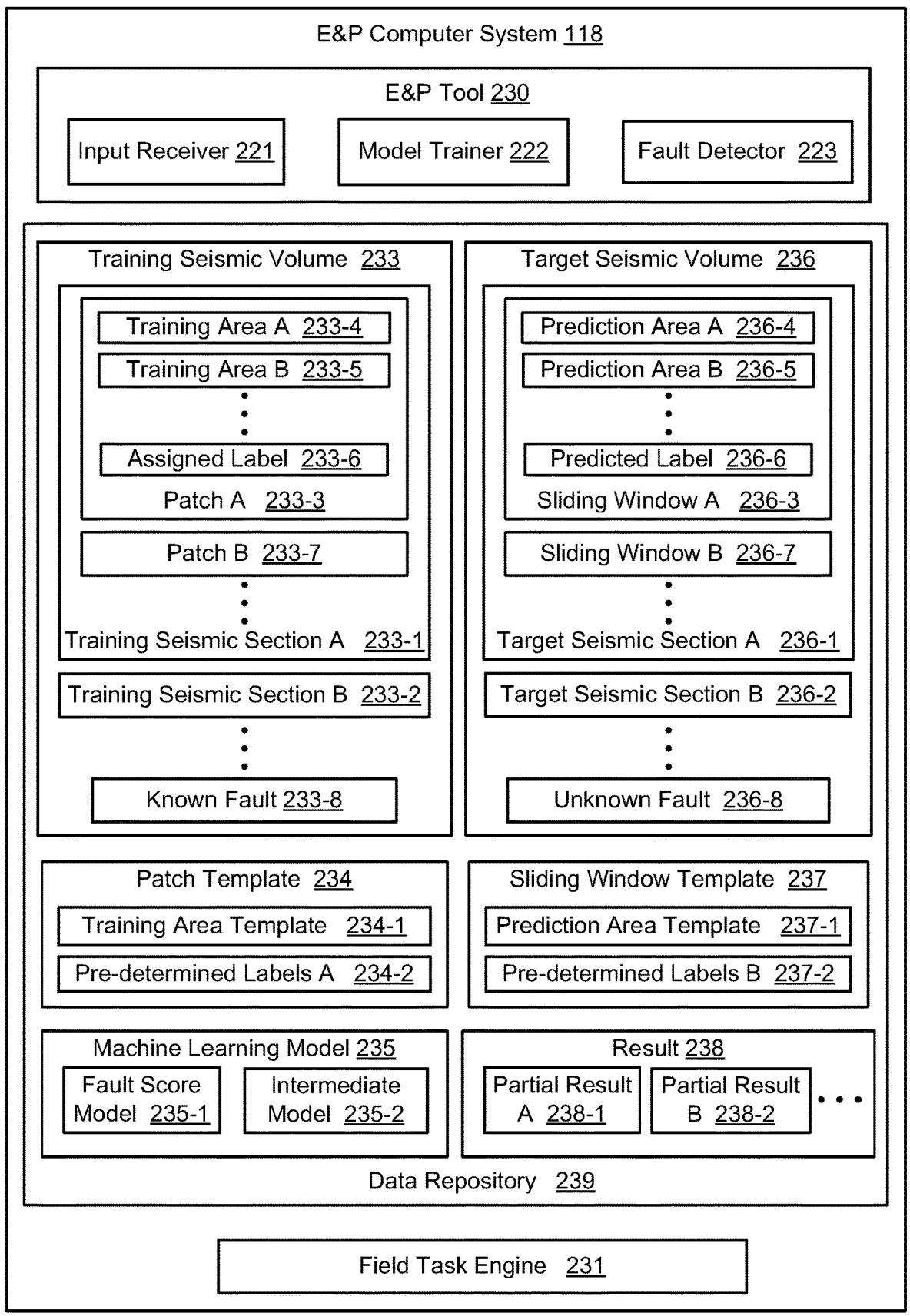
FIG. 1.2

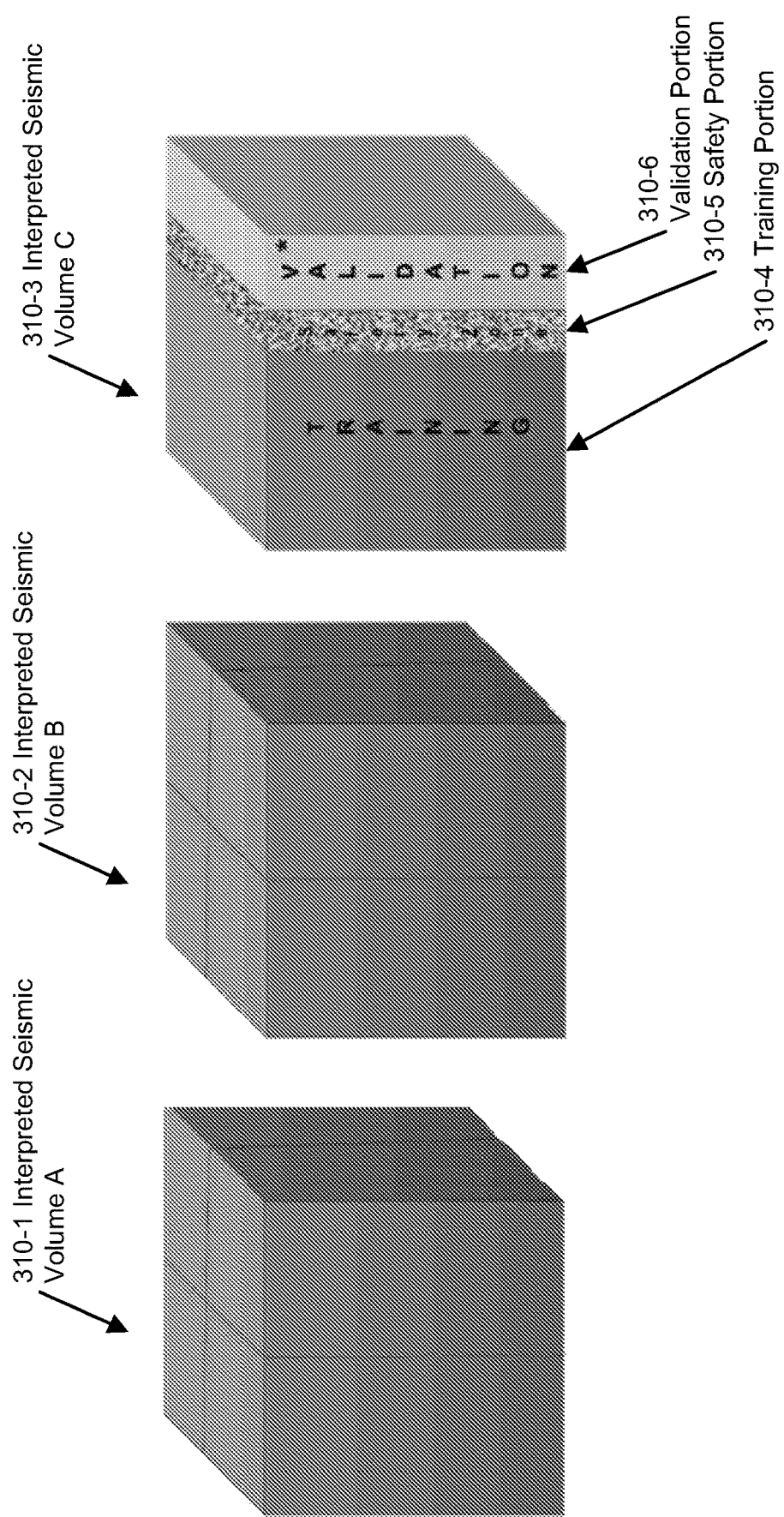
FIG. 3.1

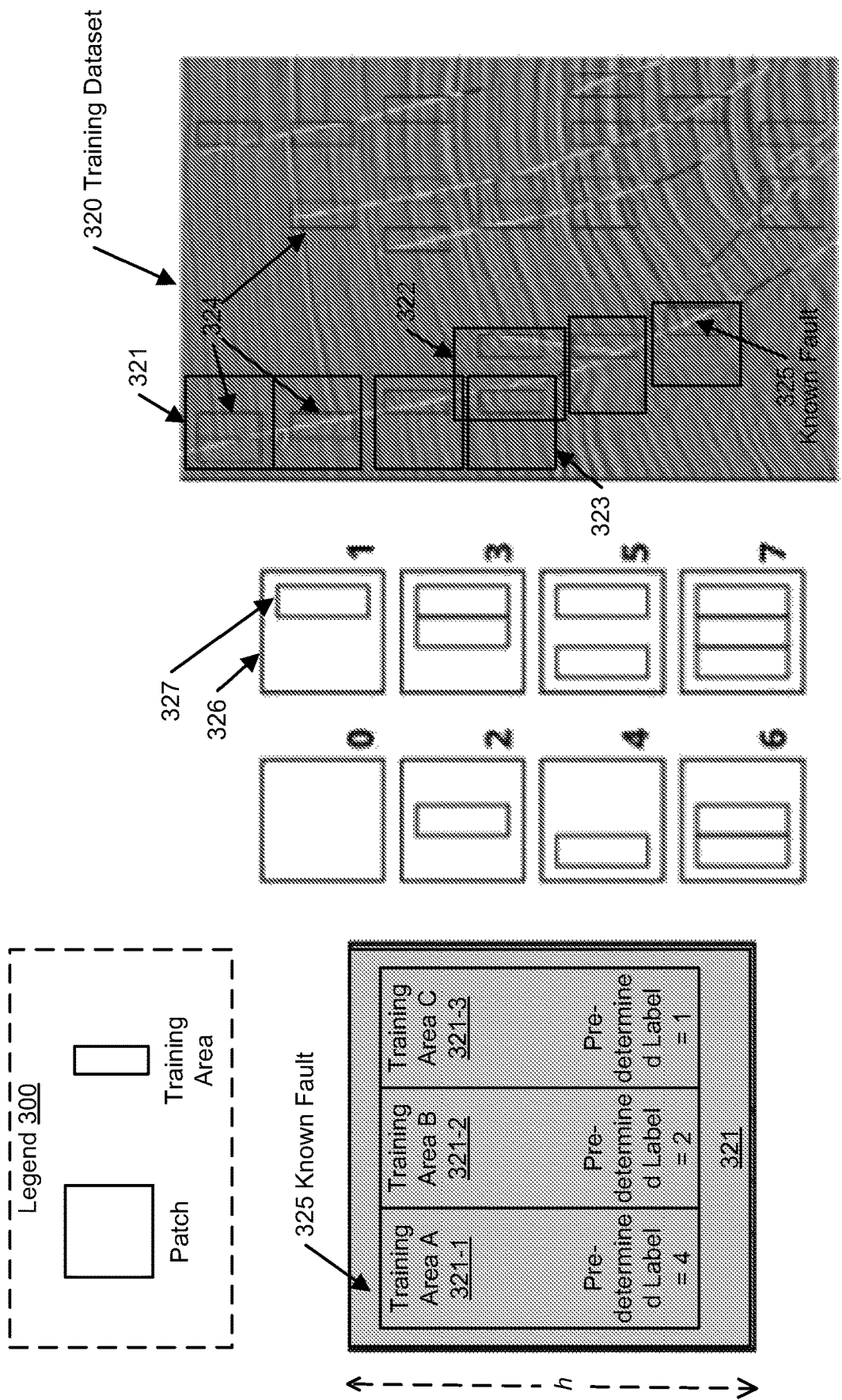
FIG. 3.2
FIG. 3.3
FIG. 3.4

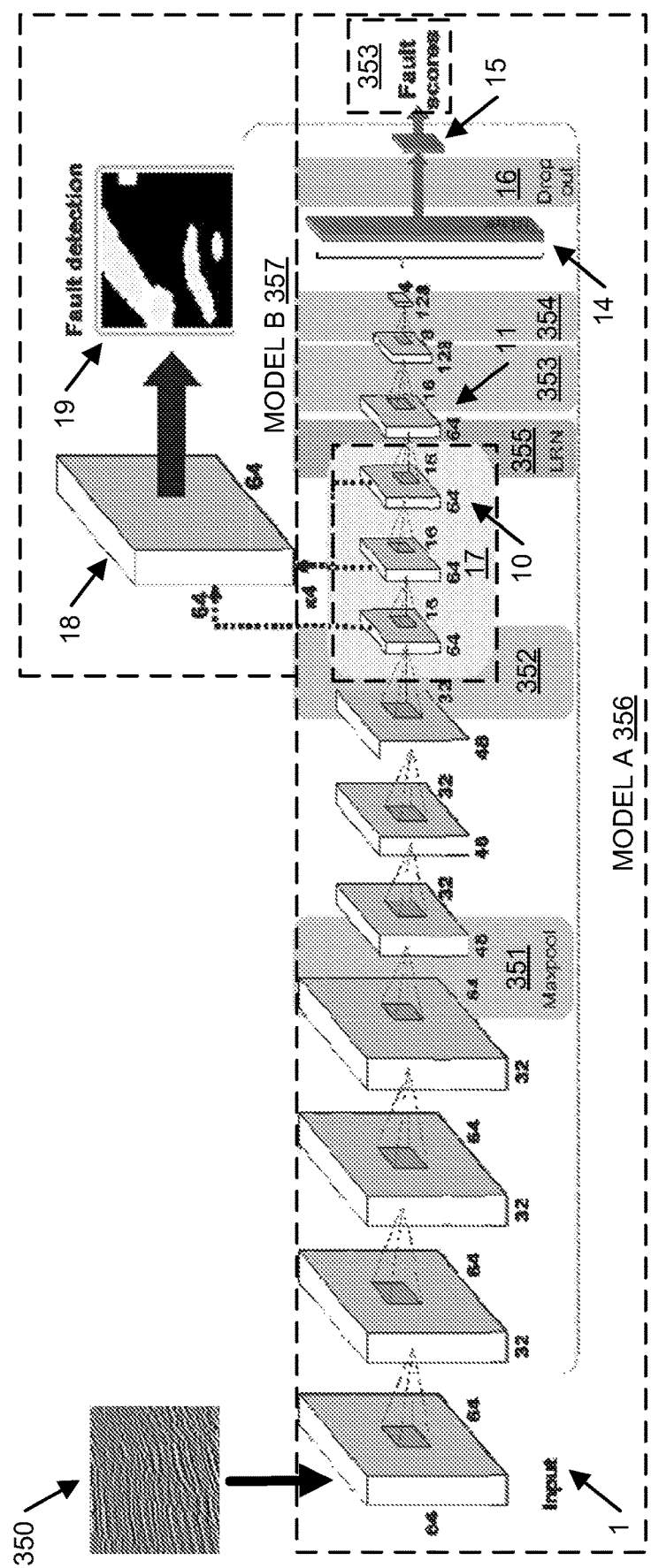
FIG. 3.5

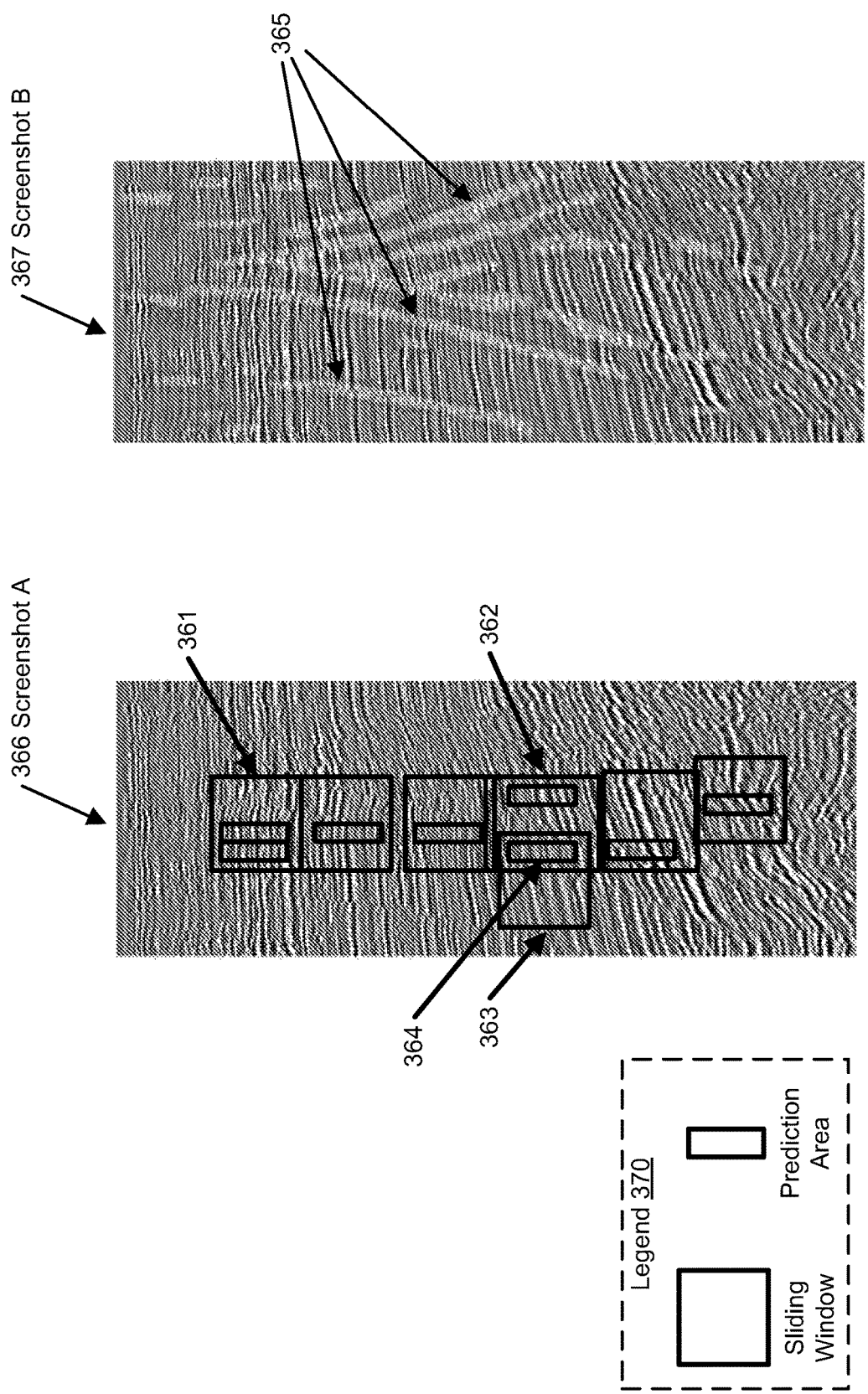
FIG. 3.6

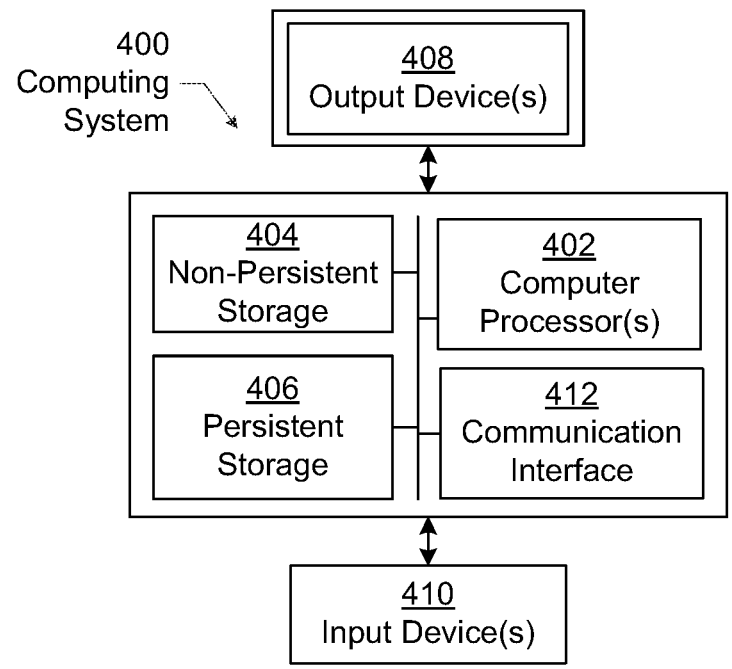
FIG. 4.1
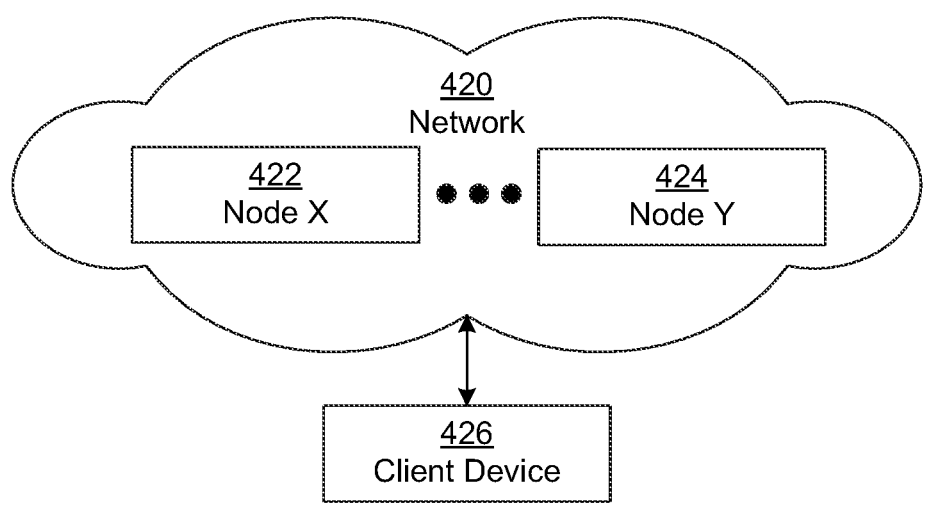
FIG. 4.2

MULTI-SCALE DEEP NETWORK FOR FAULT DETECTION

CROSS REFERENCE TO RELATED APPLICATIONS

This application claims priority to U.S. Patent Application No. 62/370,415 filed Aug. 3, 2016, entitled "Multi-Scale Deep Network for Fault Detection".

BACKGROUND

Operations, such as geophysical surveying, drilling, logging, well completion, and production, are typically performed to locate and gather valuable downhole fluids. The subterranean assets are not limited to hydrocarbons such as oil, throughout this document, the terms "oilfield" and "oilfield operation" may be used interchangeably with the terms "field" and "field operation" to refer to a site (e.g., reservoir) where any type of valuable fluids or minerals can be found and the activities required to extract them. The terms may also refer to sites where substances are deposited or stored by injecting the substances into the surface using boreholes and the operations associated with this process. Further, the term "field operation" refers to a field operation associated with a field, including activities related to field planning, wellbore drilling, wellbore completion, and/or production using the wellbore.

One or more aspects of the field operation may be facilitated by detecting a geologic fault where a reservoir may be located in the subterranean formation.

SUMMARY

In general, in one aspect, an embodiment includes detecting an unknown fault in a target seismic volume. Detecting an unknown fault in a target seismic volume includes generating a number of patches from a training seismic volume that is separate from the target seismic volume, where a patch includes a set of training areas. Detecting an unknown fault in a target seismic volume further includes generating a label for assigning to the patch, where the label represents a subset, of the set of training areas, intersected by a known fault specified by a user in the training seismic volume, and training, during a training phase and based at least on the label and the training seismic volume, a machine learning model. Detecting an unknown fault in a target seismic volume further includes, generating, by applying the machine learning model to the target seismic volume during a prediction phase subsequent to the training phase, a result to identify the unknown fault in the target seismic volume.

Other aspects will be apparent from the following description and the appended claims.

BRIEF DESCRIPTION OF DRAWINGS

The appended drawings illustrate several embodiments of multi-scale deep network for fault detection and are not to be considered limiting of its scope, for multi-scale deep network for fault detection may admit to other equally effective embodiments.

FIG. 1.1 is a schematic view, partially in cross-section, of a field in which one or more embodiments of multi-scale deep network for fault detection may be implemented.

FIG. 1.2 shows a schematic diagram of a system in accordance with one or more embodiments.

FIGS. 3.1, 3.2, 3.3, 3.4, 3.5, and 3.6 show an example in accordance with one or more embodiments.

FIGS. 4.1 and 4.2 show systems in accordance with one or more embodiments.

DETAILED DESCRIPTION

Figure 2:
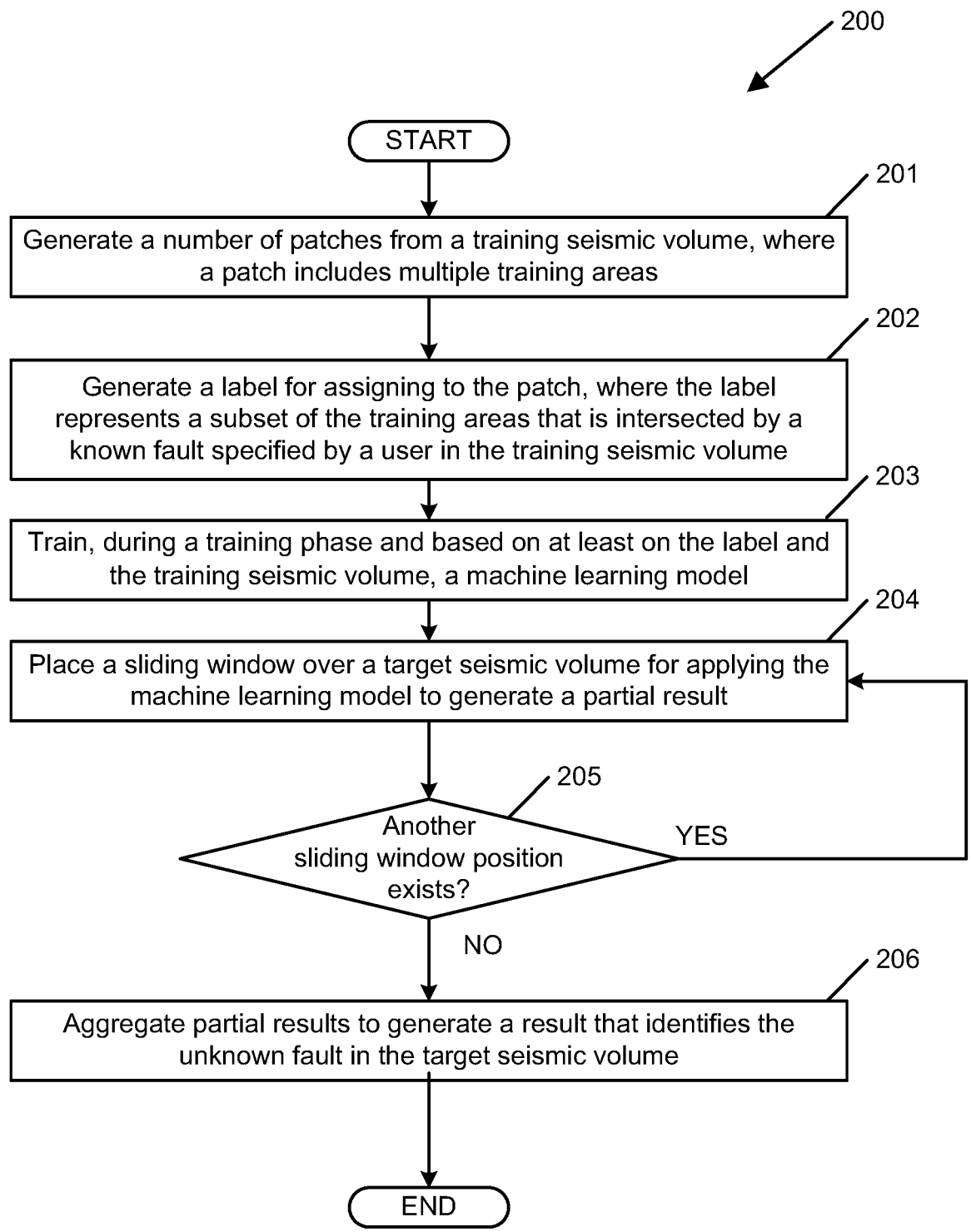
FIG. 2 shows a flowchart in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing a field operation by at least detecting an unknown fault in a target seismic volume using a machine learning model. Prior to using the machine learning model to detect the unknown fault in the target seismic volume, the machine learning model is trained based on a training seismic volume that is separate from the target seismic volume. In one or more embodiments, training the machine learning model includes dividing a training seismic section of the training seismic volume into a number of patches and further dividing the patch into a set of training areas. A label is generated and assigned to the patch. In particular, the label represents a subset, of the set of training areas, that is intersected by a known fault specified by a user in the training seismic volume. Accordingly, the machine learning model is trained based at least on the label and the training seismic volume. Subsequent to training the machine learning model using the training dataset, the machine learning model is applied to the target seismic volume to generate a result that identifies the unknown fault in the target seismic volume. In one or more embodiments, the machine learning model is applied to a sliding window at multiple sliding window positions throughout the target seismic volume to generate a predicted label for each sliding window position. The predicted labels from sliding window positions throughout a target seismic section of the target seismic volume are aggregated to generate a result (e.g., fault scores) that identify the unknown fault in the target seismic section. The unknown fault may be further identified throughout the target seismic volume by aggregating the result from multiple target seismic sections throughout the target seismic volume.

FIG. 1.1 depicts a schematic view, partially in cross section, of a field (100) in which one or more embodiments of multi-scale deep network for fault detection may be implemented. In one or more embodiments, one or more of the modules and elements shown in FIG. 1.1 may be omitted, repeated, and/or substituted. Accordingly, embodiments of multi-scale deep network for fault detection should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P)

computer system (118). The subterranean formation (104) includes several geological structures, such as a sandstone layer (106-1), a limestone layer (106-2), a shale layer (106-3), a sand layer (106-4), and a fault (107). In particular, a fault (e.g., fault (107)) is geologic fracture surface in the subterranean formation (104). These geological structures form at least one reservoir containing fluids (e.g., hydrocarbon) as described below.

In one or more embodiments, data acquisition tools (102-1), (102-2), (102-3), and (102-4) are positioned at various locations along the field (100) for collecting data of the subterranean formation (104), referred to as survey operations. In particular, the data acquisition tools (102-1), (102-2), (102-3), and (102-4) are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools (102-1), (102-2), (102-3), and (102-4). Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operations. Similarly, the wellsite system B (114-2) and wellsite system C (114-3) are associated with respective rigs, wellbores, other wellsite equipments, such as production equipment and logging equipment to perform production operations and logging operations, respectively. Generally, survey operations and wellbore operations are referred to as field operations of the field (100). In addition, data acquisition tools and wellsite equipments are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionally for actuating, adjusting, or otherwise controlling mechanisms (e.g., valve, baffle, etc.) at the field (100). The surface unit (112) may then send command signals to the field (100) (e.g., one or more mechanisms) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation (104) may be in the sea floor. Further, field data may be gathered from the field (100) that is an offshore field using a variety of offshore techniques for gathering field data.

FIG. 1.2 shows more details of the E&P computer system (118) in which one or more embodiments of multi-scale deep network for fault detection may be implemented. In one or more embodiments, one or more of the modules and elements shown in FIG. 1.2 may be omitted, repeated, and/or substituted. Accordingly, embodiments of multi-scale deep network for fault detection should not be considered limited to the specific arrangements of modules shown in FIG. 1.2.

As shown in FIG. 1.2, the E&P computer system (118) includes an E&P tool (230), a data repository (239) for storing input data, intermediate data, and resultant outputs of the E&P tool (230), and a field task engine (231) for performing various tasks of the field operation. In one or more embodiments, the data repository (239) may include one or more disk drive storage devices, one or more semiconductor storage devices, other suitable computer data storage devices, or combinations thereof. In one or more embodiments, content stored in the data repository (239) may be stored as a data file, a linked list, a data sequence, a database, a graphical representation, any other suitable data structure, or combinations thereof.

In one or more embodiments, the content stored in the data repository (239) includes a training seismic volume (233), a patch template (234), a machine learning model (235), a target seismic volume (236), a sliding window template (237), and a result (238). Each of these data elements is described below.

A machine learning model is a set of algorithms that learn from and make predictions on data. During a training phase, the machine learning model learns (i.e., is trained) from a training dataset. During a prediction phase subsequent to the training phase, the machine learning model is used to make predictions on other dataset. Deep learning is a type of machine learning that uses multiple processing layers to construct the machine learning model. A convolutional neural network (ConvNet) is a type of machine learning model for performing deep learning. A ConvNet may have multiple layers of neuron collections for processing overlapping portions of an input image.

A seismic volume is a two dimensional (2D) or three dimensional (3D) data volume that corresponds to a subterranean region and is divided into grid cells according to a grid. The grid cells are assigned seismic data based on measurements (e.g., seismic two-way response time) of corresponding locations in the subterranean region obtained from the data acquisition tools depicted in FIG. 1.1 above. As used herein, a pixel of the seismic volume is a grid cell with the assigned seismic data.

In one or more embodiments, the training seismic volume (233) is a seismic volume with one or more known faults (e.g., known fault (233-8)) so as to be used as a training dataset of the machine learning model (235). In particular, the known fault (233-8) is a collection of pixels of the training seismic volume (233) that correspond to a geologic fault in the subterranean region. For example, the pixels in the known fault (233-8) may be specified by a user performing seismic interpretation. To be used as the training dataset, one or more seismic sections (e.g., training seismic section A (233-1), training seismic section B (233-2), etc.) are extracted from the training seismic volume (233) and included in the training dataset. A seismic section is a slice of the seismic volume. A seismic section extracted from the training seismic volume (233) is referred to as a training seismic section. For example, each of the training seismic section A (233-1), training seismic section B (233-2), etc. may be the intersection of the training seismic volume (233) with a 2D plane. In one or more embodiments, the training seismic section A (233-1), training seismic section B (233-2), etc. are along the same direction (e.g., in-line direction, cross-line direction, etc.). In such embodiments, the training seismic sections are parallel. In one or more embodiments, at least some of the training seismic section A (233-1), training seismic section B (233-2), etc. are along different directions.

In one or more embodiments, one or more of the training seismic section A (233-1), training seismic section B (233-2), etc. are divided into multiple patches (e.g., patch A (233-3), patch B (233-7), etc.) according to the patch template (234). A patch is a contiguous portion of the seismic section and has multiple pixels. For example, the entirety or a portion of the training seismic section A (233-1) may be divided into multiple patches. In one or more embodiments, the machine learning model (235) includes a neural network, such as a ConvNet that has multiple layers of neuron collections for processing overlapping portions of an input seismic section. In such embodiments, the patches in the training seismic section A (233-1), training seismic section B (233-2), etc. are overlapping patches to be processed by the neuron collections in the ConvNet during the training phase. The overlapping configuration of the patches (e.g., patch A (233-3), patch B (233-7), etc.) is specified according to the patch template (234). A patch template is a template that defines characteristics and structures of a patch. The patch template may be generically applied to multiple patches in multiple training seismic sections in multiple training seismic volumes. In one or more embodiments, the patch template (234) is a data structure that includes geometric parameters, such as dimensions, shapes, and overlapping regions of the patches (e.g., patch A (233-3), patch B (233-7), etc.). The patch template (234) may further include the stacking directions and repeating periodicities based on which the overlapping patches (e.g., patch A (233-3), patch B (233-7), etc.) are stacked/repeated. A stacking direction is the direction along which two overlapping patches lie in the training seismic section. A repeating periodicity is the offset between the positions of two overlapping patches in the training seismic section. In one or more embodiments, the patches (e.g., patch A (233-3), patch B (233-7), etc.) in the training seismic sections (e.g., training seismic section A (233-1), training seismic section B (233-7), etc.) have the same geometric parameters and are stacked/repeated along two orthogonal directions. For example, the patches may have the same size of 64×64 pixels.

In one or more embodiments, the patch (e.g., patch A (233-3), patch B (233-7), etc.) is divided into multiple training areas each representing an area of multiple pixels contributing to the training dataset. For example, the patch A (233-3), or a portion thereof, is divided into the training area A (233-4), training area B (233-5), etc. according to the patch template (234). Specifically, the patch template (234) includes the training area template (234-1) that specifies the number and geometric parameters (e.g., dimensions, shapes, positions, etc.) of the training areas (e.g., training area A (233-4), training area B (233-5), etc.) within each patch. The patch template (234) may further include the stacking directions and repeating periodicities based on which the training areas (e.g., training area A (233-4), training area B (233-5), etc.) are stacked/repeated in each patch. In one or more embodiments, training areas are non-overlapping in the patch. For example, the training area A (233-4), training area B (233-5), etc. do not overlap each other in the patch A (233-3). In one or more embodiments, each training area includes multiple pixels of the training seismic volume (233). In one or more embodiments, the training areas (e.g., training area A (233-4), training area B (233-5), etc.) have the same geometric parameters. For example, the training areas, in the patches each of 64×64 pixels, may have the same size of 16×48 pixels.

In one or more embodiments, each training area specified in the training area template (234-1) is assigned a pre-determined label (e.g., a number, an alphanumeric symbol, or other types of symbol) that is unique among the training areas. In such embodiments, the patch template (234) further includes the pre-determined labels A (234-2), which is the collection of pre-determined labels of the detections areas specified in the training area template (234-1). For example, each pre-determined label in the collection may equal to a unique power of a base number (e.g., 2, 4, 10, etc.). In other words, each pre-determined label in the pre-determined labels A (234-2) uniquely identifies one of the detections areas specified in the training area template (234-1). In one or more embodiments, the patch A (233-3) is assigned a label (i.e., assigned label (233-6)) to represent a subset of the training areas, in the patch A (233-3), that are intersected by the known fault (233-8). In one or more embodiments, each training area in the subset includes at least N (e.g., one or other integer) pixel of the known fault (233-8) where N is set to prevent including statistically insignificant fault in the training dataset. In one or more embodiments, the assigned label (233-6) is based on a combination of the pre-determined labels of the training areas in the subset. For example, the assigned label (233-6) may be the sum, the concatenation, or other types of combination of the pre-determined labels of the training areas in the subset. The combination corresponds to a bit pattern where set bits and unset bits indicate the training areas intersected and not intersected by the known fault (233-8). In this manner, the assigned label indicates the approximate location where the known fault (233-8) intersects the patch. For example, the assigned label (233-6) indicates the approximate location where the known fault (233-8) intersects the patch A (233-3).

In one or more embodiments, the target seismic volume (236) is a seismic volume where unknown faults (e.g., unknown fault (236-8)) are to be identified using the machine learning model (235). In particular, the unknown fault (236-8) represents a collection of unknown pixels to be identified in the target seismic volume (236) that correspond to a fault in the subterranean region. To apply the machine learning model (235), one or more seismic sections (e.g., target seismic section A (236-1), target seismic section B (236-2), etc.) are extracted from the target seismic volume (236). For example, each of the target seismic section A (236-1), target seismic section B (236-2), etc. may be the intersection of the target seismic volume (236) with a 2D plane. In one or more embodiments, the target seismic section A (236-1), target seismic section B (236-2), etc. are along the same direction (e.g., in-line direction, cross-line direction, etc.). In one or more embodiments, at least some of the target seismic section A (236-1), target seismic section B (236-2), etc. are along different directions.

In one or more embodiments, a sliding window template (237) is laid over sliding window positions in the target seismic section A (236-1), target seismic section B (236-2), etc. to detect unknown fault(s) (236-8). A portion of the target seismic section A (236-1), target seismic section B (236-2), etc. overlaid with the sliding window template (237) at each sliding window position is referred to as a sliding window (e.g., sliding window A (236-3), sliding window B (236-7), etc.). In one or more embodiments, the machine learning model (235) includes a neural network, such as a ConvNet that has multiple layers of neuron collections for processing overlapping portions of an input seismic section. In such embodiments, the sliding windows in the target seismic section A (236-1), target seismic section B (236-2), etc. are overlapping sliding windows to be processed by the neuron collections in the ConvNet. The overlapping configuration of the sliding windows (e.g., sliding window A (236-3), sliding window B (236-7), etc.) is specified according to the sliding window template (237). A sliding window template is a template that defines characteristics and structures of a sliding window. The sliding window template may be generically applied to multiple target seismic sections in the target seismic volume (236). In one or more embodiments, the sliding window template (237) is a data structure that includes geometric parameters, such as dimensions, shapes, and overlapping regions of the sliding windows (e.g., sliding window A (236-3), sliding window B (236-7), etc.). The sliding window template (237) may further include the stacking directions and repeating periodicities based on which the overlapping sliding windows (e.g., sliding window A (236-3), sliding window B (236-7), etc.) are stacked/repeated. In one or more embodiments, the sliding windows (e.g., sliding window A (236-3), sliding window B (236-7), etc.) in the target seismic sections (e.g., target seismic section A (236-1), target seismic section B (236-2), etc.) have the same geometric parameters and are stacked/repeated along two orthogonal directions.

In one or more embodiments, the sliding window (e.g., sliding window A (236-3), sliding window B (236-7), etc.) is divided into multiple prediction areas. For example, the sliding window A (236-3), or a portion thereof, is divided into the prediction area A (236-4), prediction area B (236-5), etc. according to the sliding window template (237). Specifically, the sliding window template (237) includes the prediction area template (237-1) that specifies the number and geometric parameters (e.g., dimensions, shapes, positions, etc.) of the prediction areas (e.g., prediction area A (236-4), prediction area B (236-5), etc.) within each sliding window. The sliding window template (237) may further include the stacking directions and repeating periodicities based on which the prediction areas (e.g., prediction area A (236-4), prediction area B (236-5), etc.) are stacked/repeated in each sliding window. In one or more embodiments, prediction areas are non-overlapping in the sliding window. For example, the prediction area A (236-4), prediction area B (236-5), etc. do not overlap each other in the sliding window A (236-3). In one or more embodiments, each prediction area includes multiple pixels of the target seismic volume (236). In one or more embodiments, the prediction areas (e.g., prediction area A (236-4), prediction area B (236-5), etc.) have the same geometric parameters. For example, the prediction areas, in the sliding window of 64×64 pixels, may have the same size of 16×48 pixels.

In one or more embodiments, each prediction area specified in the prediction area template (237-1) is assigned a pre-determined label (e.g., a number, an alphanumeric symbol, or other types of symbol) that is unique among the prediction areas. In such embodiments, the sliding window template (237) further includes the pre-determined labels B (237-2), which is the collection of pre-determined labels of the prediction areas specified in the prediction area template (237-1). In other words, each pre-determined label in the pre-determined labels B (237-2) uniquely identifies one of the prediction areas specified in the prediction area template (237-1). In one or more embodiments, the intermediate model (235-2) generates a predicted label (236-6) to represent the approximate location where the unknown fault (236-8) may intersect the sliding window. In one or more embodiments, the predicted label (236-6) is based on a combination of the pre-determined labels of the prediction areas in the subset. For example, the predicted label (236-6) may be the sum, the concatenation, or other types of combination of the pre-determined labels of the prediction areas that are predicted to intersect the unknown fault (236-8). In this manner, the predicted label (236-6) indicates the approximate location where the unknown fault (236-8) is predicted to intersect the sliding window. In this context, the predicted label (236-6) is referred to as the fault detection mask of the sliding window. For example, the predicted label (236-6) indicates the approximate location where the unknown fault (236-8) may intersect the sliding window A (236-3) and is referred to as the fault detection mask of the sliding window A (236-3).

In one or more embodiments, the patch template (234) and the sliding window template (237) specify the patches and sliding windows to have the same geometric parameters and the same stacking directions and repeating periodicities of stacking/repeating. In other words, each patch in the training seismic volume (233) and each sliding window in the target seismic volume (236) have the same dimensions, shapes, and overlapping regions, and are stacked/repeated in the same stacking directions with the same repeating periodicities. For example, each of the patches and each of the sliding windows may have the same size of 64×64 pixels. Further in such embodiments, the training area template (234-1), the pre-determined labels A (234-2), the prediction area template (237-1) and the pre-determined labels B (237-2) specify the training areas and prediction areas to have the same geometric parameters and the same stacking directions and repeating periodicities of stacking/repeating. In other words, each training area in the patches and each prediction area in the sliding windows have the same dimensions, shapes, and are stacked/repeated in the same stacking directions with the same repeating periodicities. For example, each of the training areas and each of the prediction areas may have the same size of 16×48 pixels.

In one or more embodiments, the machine learning model (235) includes a fault score model (235-1) for generating fault scores and an intermediate model (235-2) for generating fault detection masks as an intermediate result of the fault scores. The fault score is a probability measure of a prediction area containing an unknown fault to be detected. The fault detection mask is a predicted label that indicates the approximate location where the unknown fault intersects a sliding window. In one or more embodiments, the fault detection mask includes a bit pattern of set and unset bits (e.g., 1 and 0) where the set bits identify the prediction areas intersected by the unknown fault and the unset bits identify the prediction areas not intersected by the unknown fault.

In one or more embodiments, the machine learning model (235) is iteratively applied to multiple sliding windows and the fault detection mask of each sliding window is a partial result of the machine learning model (235). For example, the partial result A (238-1) may correspond to the fault detection mask of the sliding window A (236-3) while the partial result B (238-2) may correspond to the fault detection mask of the sliding window B (236-7). The fault score model (235-1) aggregates the partial results (e.g., partial result A (238-1), partial result B (238-2), etc.) into the result (238) of the machine learning model (235). In one or more embodiments, the result (238) includes one fault score for each prediction area in the target seismic section A (236-1). For example, the fault scores of the prediction areas in the target seismic section A (236-1) may be generated as the union of the fault prediction masks of the sliding windows in the target seismic section A (236-1). In other words, the fault score is based on how many overlapping sliding windows have respective fault detection masks indicating the prediction area as intersecting the unknown fault (236-8). For example, the sliding window A (236-3) and sliding window B (236-7) may overlap and both include the prediction area A (236-4). The prediction area A (236-4) will have a higher fault score if both fault detection masks of the sliding window A (236-3) and sliding window B (236-7) include the prediction area A (236-4). The prediction area A (236-4) will have a lower fault score if only one of the fault detection masks of the sliding window A (236-3) and sliding window B (236-7) includes the prediction area A (236-4). The prediction area A (236-4) will have the lowest fault score if none of the fault detection masks of the sliding window A (236-3) and sliding window B (236-7) includes the prediction area A (236-4).

In one or more embodiments, the E&P tool (230) includes the input receiver (221), the model trainer (222), and the fault detector (223). Each of these components of the E&P tool (230) is described below.

In one or more embodiments, the input receiver (221) is configured to obtain the training seismic volume (233), at least in part, for use by the model trainer (222). In one or more embodiments, the input receiver (221) obtains seismic data in the training seismic volume (233), at least in part, from the surface unit (112) depicted in FIG. 1.1 above. In one or more embodiments, the input receiver (221) obtains at least a portion of the training seismic volume (233) from a user. For example, certain pixels in the training seismic volume (233) may be specified by the user as corresponding to a fault. For example, the input receiver (221) may obtain one or more portions of the seismic data and fault specification in the training seismic volume (233) from the surface unit (112) and the user intermittently, periodically, in response to a user activation, or as triggered by an event.

In one or more embodiments, the model trainer (222) is configured to generate a training dataset and to train the machine learning model (235) using the training dataset. In particular, the model trainer (222) generates the patches, training areas, and labels in the training seismic volume (233). In one or more embodiments, the model trainer (222) generates the training dataset and trains the machine learning model (235) using the method described in reference to FIG. 2 below.

In one or more embodiments, the fault detector (223) is configured to generate the result (238) to identify one or more unknown faults in the target seismic volume (236). In one or more embodiments, the fault detector (223) generates the result (238) using the method described in reference to FIG. 2 below.

In one or more embodiments, the result (238) generated by the fault detector (223) may be displayed to a user using a two dimensional (2D) display, three dimensional (3D) display, or other suitable displays. For example, the result (238) may be used to predict hydrocarbon content throughout portions of the field (100) and to facilitate drilling, fracturing, or other exploratory and/or production operations of the field (100).

In one or more embodiments, the E&P computer system (118) includes the field task engine (231) that is configured to generate a field operation control signal based at least on a result generated by the E&P tool (230), such as based on the result (238). As noted above, the field operation equipment depicted in FIG. 1.1 above may be controlled by the field operation control signal. For example, the field operation control signal may be used to control drilling equipment, an actuator, a fluid valve, or other electrical and/or mechanical devices disposed about the field (100) depicted in FIG. 1.1 above.

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIG. 2 depicts an example method flowchart (200) in accordance with one or more embodiments. For example, the method depicted in FIG. 2 may be practiced using the E&P computer system (118) described in reference to FIGS. 1.1 and 1.2 above. In one or more embodiments, one or more of the elements shown in FIG. 2 may be omitted, repeated, and/or performed in a different order. Accordingly, embodiments of multi-scale deep network for fault detection should not be considered limited to the specific arrangements of elements shown in FIG. 2.

Initially in Block 201, a number of patches is generated from a training seismic volume. The training seismic volume includes one or more known faults, e.g., specified by a user performing seismic interpretation. In one or more embodiments, a training seismic section of the training seismic volume is divided into patches according to a patch template. In addition, the patch is further divided into a set of training areas according to a patch template. Each training area is assigned a unique pre-determined label specified in the patch template. Accordingly, certain training areas in certain patches of certain training seismic sections are intersected by the one or more known faults.

In Block 202, a label is generated for assigning to the patch. Within each patch, certain training areas that intersect the known fault(s) are identified. In one or more embodiments, the label is generated by combining (e.g., summing, concatenating, etc.) the unique pre-determined labels of the training areas intersecting the known fault(s) in the patch. Based on the uniqueness of each pre-determined label, the combination corresponds to a bit pattern where set bits and unset bits indicate the training areas intersected and not intersected by the known fault (s). Accordingly, the assigned label indicates the locations where the known fault(s) intersects the patch.

In Block 203, a machine learning model is trained, during a training phase, based at least on the label and the training seismic volume. In one or more embodiments, a large number (e.g., hundreds, thousands, hundreds of thousands, etc.) of patches (containing seismic data of the pixels in each patch) with the assigned labels are included in a training dataset that is used to train the machine learning model. For example, the patches may be extracted from multiple training seismic sections of the training seismic volume. In one or more embodiments, physical locations of the patches in the training seismic volume are removed when the training dataset is constructed. In other words, the patches are included in the training dataset without ordering based on the physical locations. In one or more embodiments, training the machine learning model includes analyzing the pixels in each patch to identify pixel-level seismic data patterns that correlate with the bit pattern of the assigned label. In particular, training the machine learning model includes adding the correlation results to the machine learning model.

In Block 204, in a prediction phase subsequent to the training phase, a sliding window is placed over a target seismic volume for applying the machine training model to generate a partial result. Applying the machine learning model includes analyzing the pixels in the sliding window based on the correlation results from the training phase. In one or more embodiments, the sliding window is placed at a sliding window position in a target seismic section of the target seismic volume. In one or more embodiments, the sliding window is based on a sliding window template that matches the patch template used in the training phase. In other words, the sliding window has the same geometric parameters as the patches and includes multiple prediction areas that have the same geometric parameters, same pre-determined labels, and same physical layout as the training areas in the patches. In one or more embodiments, the partial result is a predicted label generated by the machine learning model and assigned to the sliding window. The partial result includes the predicted label and the corresponding sliding window location. In particular, the predicted label is the fault detection mask to identify certain prediction areas in the sliding area that are intersected by unknown fault(s) in the target seismic volume.

In one or more embodiments, in the initial iteration of the flowchart (200), the sliding window is placed at an initial sliding window position in the target seismic section. For example, the initial sliding window position may be specified in the sliding window template or specified by a user. In each subsequent iteration of the flowchart (200), the sliding window is placed at a subsequent sliding window position that is stacked/repeated from the sliding window position in the previous iteration according to the stacking directions and repeating periodicities specified in the sliding window template.

In Block 205, a determination is made as to whether another sliding window exists to be placed over the target seismic volume. If the determination is positive, i.e., at least one sliding window exists to be placed over the target seismic volume, the method returns to Block 204. If the determination is negative, i.e., no more sliding window exists to be placed over the target seismic volume, the method proceeds to Block 206.

In Block 206, partial results are aggregated to generate a result that identifies the unknown fault(s) in the target seismic section. In one or more embodiments, the partial results are aggregated based on the sliding window locations contained in the partial results. Based on the sliding window location contained in each partial result, the partial results from the iterations of Blocks 204 and 205 are placed throughout the target seismic section. In one or more embodiments, aggregating the partial results includes using the predicted label to identify the prediction areas in each sliding window that are predicted to intersect the unknown fault(s). The position of each identified prediction area in the sliding window is then determined according to the sliding window template. Accordingly, the position of each identified prediction area in the target seismic section is determined by combining the sliding window location and the position of the identified prediction area in the sliding window. Because the sliding windows overlap each other, the fault detection masks of the overlapping sliding windows may overlap as well. Therefore, a prediction area may be identified in multiple overlapping sliding windows as intersecting the unknown fault(s). In other words, the prediction area may be included in multiple fault detection masks when aggregating the partial results. Accordingly, the fault score is generated for the prediction area based on the number of times the prediction area is included in the aggregated fault detection masks. In other words, the higher the number of times the prediction area is included in the aggregated fault detection mask, the higher the fault score is for the prediction area.

In one or more embodiments, a location of the fault in the subterranean formation is determined based on the fault scores and/or the fault detection masks. A field operation may be defined based on the location of the fault. The field operation may be to plan a drilling or production operation, select a location to extract hydrocarbons, to perform other operation, or perform any combination thereof. In one or more embodiments, a control signal is generated based on the result of Block 206 (i.e., fault scores and/or fault detection masks) and sent to a mechanism in the field. For example, the control signal may adjust a drilling equipment or a flow control valve in a wellsite to perform a field operation.

FIGS. 3.1, 3.2, 3.3, 3.4, 3.5, and 3.6 show an example in accordance with one or more embodiments. In one or more embodiments, the example shown in these figures may be practiced using the E&P computer system shown in FIGS. 1.1 and 1.2 and the method described in reference to FIG. 2 above. The following example is for example purposes and not intended to limit the scope of the claims.

FIG. 3.1 shows an example of interpreted seismic volume A (310-1), interpreted seismic volume B (310-2), and interpreted seismic volume C (310-3) that include known faults for training a machine learning model to detect unknown faults in other target seismic volumes. For example, the known faults are identified from manual seismic interpretation in the interpreted seismic volume A (310-1), interpreted seismic volume B (310-2), and interpreted seismic volume C (310-3). Instead of manual seismic interpretation, the trained machine learning model may be applied to other seismic volumes (i.e., target seismic volumes) to automatically detect unknown faults. Using machine learning model to automatically detect unknown faults reduces the subjectivity bias in seismic image analysis. The machine learning model trained using interpreted seismic volumes is an alternative approach to fault detection using seismic data which relies mainly on the experience of an individual to highlight faults in the seismic interpretation process. The machine learning model trained using interpreted seismic volumes may build upon the experience of many people who performed manual seismic interpretations.

In one application scenario where multiple interpreted seismic volumes are available, separate seismic volumes are used for training purposes and testing purposes. For example, the interpreted seismic volume A (310-1) may be used as the training dataset while the interpreted seismic volume B (310-2) may be used as the validation dataset. In another application scenario where multiple interpreted seismic volumes are not available, a single seismic volume is used for both training purposes and testing purposes. For example, the interpreted seismic volume C (310-3) may be subdivided into a training portion (310-4) used as the training dataset and a validation portion (310-6) used as the validation dataset. In addition, the training portion (310-4) and the validation portion (310-5) are separated from each other with a safety portion (310-5) in between to reduce any similarity between the training dataset and validation dataset. For example, the training portion (310-4), safety portion (310-5) and validation portion (310-6) may correspond to 70%, 10%, and 20%, respectively of the interpreted seismic volume C (310-3).

FIG. 3.2 shows example details of a training dataset (320) according to the legend (300). For example, the training dataset (320) may correspond to one or more seismic sections of the interpreted seismic volume A (310-1) or the training portion (310-4) of the interpreted seismic volume C (310-3) depicted in FIG. 3.1 above. Known faults (e.g., known fault (325)) exist in the interpreted seismic volume A (310-1) or the training portion (310-4) and correspond to white trajectories superimposing seismic data represented as grey patterns in the training dataset (320). For every seismic section used for training purposes, a set of patches (e.g., patches (321), (322), (323), etc.) is extracted. In the example shown in FIG. 3.2, each patch has a size of 64×64 pixels divided into three training areas, each of 14×48 pixels. In particular, the patch and each training area have the same height h of 48 pixels corresponding to a vertical direction of the earth formation. Dividing the patches by slicing along the vertical direction is particularly suitable due to the vertical nature of faults in the earth formation. The set of patches may include overlapping patches that share common training areas. For example, the patches (322) and (323) overlap each other and share a common training area. Each patch is assigned a label depending on whether a user (e.g., a human seismic interpreter) determines that the patch contains fault(s) or not. In other words, the seismic interpretation result is used as interpreted for machine learning. The label corresponds to an approximate location where the fault is in the patch, such as left, center, right, or any combination thereof. Within the training dataset (320), patches that do not overlap the known fault (325) are not explicitly shown for clarity. However, the training areas in the omitted patches that overlap other known faults are shown. Although the patches are shown to exhibit varying amount of physical overlap as an illustration, the set of patches may be laid out in a repetitive pattern having consistent amounts of physical overlap throughout the training dataset (320). Although the training dataset (320) is described using specific sizes and layout patterns of the patches and training areas, other sizes and layout patterns of the patches and training areas may also be used that are different from what are shown in FIG. 3.2. For example, the patch size may be increased for training datasets with large faults and a low density. The density of faults in this context is defined as the area occupied by faults, e.g., based on number of pixels, relatively to the total size of seismic sections that are being labeled.

FIG. 3.3 shows example combinations of training areas in each patch of the training dataset (320) according to the legend (300). Each combination is assigned a label based on training area(s) (e.g., training area (327)) that intersect any fault in any particular patch (e.g., patch (326)). For example, the label 0 is assigned to the combination where no training area intersects any fault, the labels 1, 2, and 4 are assigned to combinations each having one training area intersecting the fault, the labels 3, 5, and 6 are assigned to combinations each having two training areas intersecting the fault, and the label 7 is assigned to the combination where three training areas intersect the fault. The eight possible labels provide a degree of granularity that capture possible fault intersection configurations.

FIG. 3.4 shows example details of the patch (321) depicted in FIG. 3.2 above. Specifically, the patch (321) includes a training area A (321-1), training area B (321-2), and training area C (321-3) that are associated with respective pre-determined labels 4, 2, and 1 (i.e., unique powers of the base number 2) for generating the label according to the description of FIG. 3.3 above. The pre-determined labels of the training areas are additive. For example, the known fault (325) intersects the training area A (321-1) with the pre-determined label 4 and intersects the training area B (321-2) with the pre-determined label 2. Accordingly, the patch (321) is assigned the label 6 (i.e., 4+2). Similarly, the patches (322) and (323) are assigned the labels 5 and 1, respectively.

Because the training area A (321-1), training area B (321-2), and training area C (321-3) use unique powers of the base number 2 as respective pre-determined labels, the binary number form of the assigned labels 0-7 shown in FIG. 3.3 above corresponds to where the fault intersects the patch. In other words, the binary bit pattern of the predicted label corresponds to the fault detection mask generated for the sliding window. For example, in FIG. 3.3, the binary number 000 of the assigned label 0 indicates that the fault does not intersect the patch. In another example, the binary numbers 001, 010, and 101 of the assigned labels 1, 2, and 4, respectively, indicate that the fault intersects the one training area in the right, middle, and left portions, respectively, of the patch. In yet another example, the binary numbers 011, 101, and 110 of the assigned labels 3, 5, and 6, respectively, indicate that the fault intersects two training areas in the right two thirds, right one third and left one third, and left two thirds portions, respectively, of the patch. In still another example, the binary number 1 of the assigned label 7 indicates that the fault intersects three training areas of the patch.

Although the patch (321) depicted in FIGS. 3.2 and 3.4 is described to include specific number/size and pre-determined labels of the training areas, other number/size and pre-determined labels of the training areas may also be used that are different from what are shown in FIGS. 3.2 and 3.4.

FIG. 3.5 shows an example of machine learning models Model A (356) and Model B (357) that are jointly trained using the training dataset (320) described in reference to FIGS. 3.2-3.4 above. Training may be performed in an end-to-end configuration using backpropagation to optimize the output fault detection. The Model A (356) is applied to the input seismic section (350) to generate the fault scores (353) using deep learning algorithms. The deep learning algorithms discover multiple levels of representation, or a hierarchy of features, with higher-level and more abstract features defined in terms of (or generating) lower-level features. The Model B (357) is an optional addition to the Model A (356) that generates alternative/intermediate results (i.e., image (19)) associated with the fault scores (353).

As shown in FIG. 3.5, Model A (356) and Model B (357) are examples of the machine learning model (235) depicted in FIG. 1.2 above. In particular, the Model A (356) and Model B (357) are convolution neural networks (ConvNets) to perform the deep learning algorithms. A ConvNet is a variation of the multiple layer perceptron (MLP), which is a class of feedforward artificial neural network having multiple layers of cores. The Model A (356) is structured into different convolution layers (e.g., layers (1, 10, 11, etc.)) of cores. Each core is a neuron that performs simple computations, such as the weighted sum computation. Specifically, each layer of the Model A (356) transforms a set of feature maps to another set of feature maps using the convolution operation ⊗ based on a set of filters. Mathematically, if $W_i^l$ and $b_i^l$ respectively denote the weight matrix and the bias vector of the $i^{th}$ filter of the $l^{th}$ convolutional layer, the transformation of the feature maps between the $l^{th}$ and $(l-1)^{th}$ convolutional layers may be represented by Eq. (1). In Eq. (1), $M_i^l$ denotes an $i^{th}$ unit of the feature maps of the $l^{th}$ convolutional layer while $M^{l-1}$ denotes the feature map of the $(l-1)^{th}$ convolutional layer.

$$M_i^l = M^{l-1} \lfloor W_i^l + b_i^l \qquad \text{Eq. (1)}$$

Rectifying linear unit (ReLU) is the activation function for the $i^{th}$ unit of the $l^{th}$ convolutional layer and is defined in Eq (2).

$$M_i^l = \max(M_i^{l-1}, 0) \qquad \text{Eq. (2)}$$

A pooling layer performs a spatial down sampling of the input feature map. Pooling is used to decrease the input dimensionality of the next layer. Pooling helps invariance to small translations (i.e., variations) of the input.

After several convolutional and pooling layers, the high-level reasoning in the neural network is performed via fully connected layers (fcLayers). Let $W^l$ denote the incoming weight matrix and $b^l$ the bias vector of a fully connected layer l, the fcLayer is defined in Eq. (3). In Eq. (3), htile(.) operator tiles the feature maps of the input volume along the height (h) direction, * is the matrix multiplication and is ⊕ the element-wise addition.

$$M^l = \text{htile}(M^{l-1}) * W^l \oplus b^l \qquad \text{Eq. (3)}$$

Dropout layer performs a regularization method for neural networks to prevent ConvNets from overfitting.

Local Response Normalization (LRN) is a layer for normalizing unbounded activations of ReLU functions, e.g., to detect high frequency features with a large response.

Returning to the discussion of FIG. 3.5, the MODEL A (356) includes multiple convolution layers separated by 4 pooling layers (i.e., maxpooling layer (351, 352, 353, 354)) and an LRN layer (355) between convolution layers (10, 11). The MODEL A (356) ends with 2 fcLayers (14, 15) separated by a dropout layer (16) to reduce overfitting. The filter sizes for every group of convolution layers, delimited by the maxpooling layers, decrements in a sequence from 64, 32, 16, to 8.

During the training phase, the MODEL A (356) is trained using a high number of labeled patches depicted in FIG. 3.2 above. The dense training data may originate from different seismic volumes and from different parts of the world to allow the system to analyze a completely unknown survey.

During the validation or prediction phase, the MODEL A (356) is applied to the input seismic section (350) to generate the fault scores (353). The fault scores (353) are computed using a softmax function (i.e., normalized exponential function) and cross entropy strategy (i.e., a Monte-Carlo method) from the output of the fcLayer (15). For example, in the validation phase, the input seismic section (350) may be from the interpreted seismic volume B (310-2) or the validation portion (310-6) of the interpreted seismic volume C (310-3) depicted in FIG. 3.1 above. In the prediction phase, the input seismic section (350) may be from a seismic volume where unknown faults are to be detected.

During either the validation phase or prediction phase, a highly overlapping sliding window is laid over the input seismic section (350) to predict faults by applying the MODEL A (356) to each sliding window. In a similar manner how the set of patches cover the training dataset (320) depicted in FIG. 3.2 above, the sliding window is laid over the input seismic section (350) in multiple locations to cover the entire input seismic section (350). Each sliding window may correspond to a patch and have the same (e.g., 64×64 pixels) as the patch. The sliding window is also divided into prediction areas in the same way as how the path is divided into training areas. Similar to the label assigned to each patch by a user during the training phase, the result of applying the MODEL A (356) to a sliding window may include a predicted label having similar format as the assigned label. The predicted label corresponds to the prediction area(s) intersecting an unknown fault in the sliding window. The results of applying the MODEL A (356) to multiple sliding window locations are aggregated to generate the fault scores (353). During the validation phase or prediction phase, the MODEL A (356) generates a fault score for each sliding window location and/or each training area in the sliding window. The fault score generated for validating each sliding window location may correspond to the label assigned to a patch of the training dataset. The MODEL A (356) is validated if the fault score matches the initial assigned label over a majority (e.g., >80%) of the patches or the sliding window locations.

In addition, the Model B (357) is used to predict approximate locations where the unknown fault intersects the sliding window, as an intermediate result of detecting faults, by exploiting distinct features from intermediate layers (17) of the Model A (356). The feature maps are automatically resized (e.g., from 16 to 64) to have the same spatial resolution by bilinear interpolation before eventual concatenation into the layer (18). Normalization is then applied so that the fault prediction values are in the zero to one range. The final output is then the concatenation of the fault detection masks (i.e., intermediate result) into an image (19) with the same size as the input seismic section (350). This image (19) is then overlaid on top of the input seismic section (350) to show where the faults are located as illustrated in FIG. 3.6.

FIG. 3.6 shows an example of a screenshot A (366) and a screenshot B (367). In an example scenario, the screenshot A (366) and screenshot B (367) may correspond to the input seismic section (350) and fault scores (353), respectively, depicted in FIG. 3.5 above. In another example scenario, the screenshot A (366) and screenshot B (367) may correspond to the input seismic section (350) and image (19), respectively, depicted in FIG. 3.5 above. The screenshot A (366) is superimposed by a sliding window at overlapping positions according to the legend (370). In both example scenarios, as described in reference to FIG. 3.5 above, the sliding window is laid over multiple overlapping positions in the input seismic section (350) when the MODEL A (356) is applied. In particular, when applied to the input seismic section (350), the MODEL A (356) generates a predicted label for each sliding window position. The predicted label represents training areas (explicitly shown) in the sliding window that are predicted by the MODEL A (356) as containing an unknown fault. The pattern of the explicitly shown training areas in each sliding window corresponds to the fault detection mask of the sliding window. Other training areas in the sliding window that are predicted by the MODEL A (356) as not containing any unknown fault are omitted in FIG. 3.6. The predicted label and the prediction areas may be based on the same configuration as the patch (321) depicted in FIG. 3.4 above. Accordingly, the predicted labels of the sliding window positions (361), (362), and (363) are 6, 5, and 1, respectively. Similar to the training area combinations depicted in FIG. 3.3 above, the binary number form of the predicted labels 0-7 corresponds to where the unknown fault intersects the sliding window.

In both example scenarios, the screenshot B (367) corresponds to a heat map generated by reconstituting the output seismic section from the sliding window positions laid over the input seismic section (350). The shading intensities in the heat map represent the fault scores or fault detection masks. The higher the intensity in the heat map, the more overlapping sliding window positions exist that have similar predictions. For example, the intensity of the training area (364) is higher in the heat map than other training areas because the training area (364) is predicted twice as containing the unknown fault when the MODEL A (356) is applied to the sliding window position (362) and when the MODEL A (356) is applied to the sliding window position (363). In other words, applying the MODEL A (356) to the sliding window position (362) generates the first partial result that predicts the training area (364) as containing the unknown fault. In addition, applying the MODEL A (356) to the sliding window position (363) generates the second partial result that also predicts the training area (364) as containing the unknown fault. Aggregating the first partial result and the second partial result generates the higher intensity of the training area (364) in the final result (i.e., heat map). The higher intensity of the training area (364) contributes to the heat map shading variation patterns (365) in the screenshot B (367). In this manner, the heat map shading variation patterns (365) represent identified faults or predicted fault locations generated by the Model A (356) and Model B (357), respectively, depicted in FIG. 3.5 above.

Embodiments of multi-scale deep network for fault detection may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the claims. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 4.1 and the nodes and/or client device in FIG. 4.2. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method for detecting an unknown fault in a target seismic volume, comprising:
generating a plurality of patches from a training seismic volume that is separate from the target seismic volume, wherein a patch of the plurality of patches comprises a set of training areas, and wherein the plurality of patches comprises contiguous portions of multiple pixels of the training seismic volume;

generating a label for assigning to the patch, wherein the label represents a subset, of the set of training areas, intersected by a known fault specified by a user in the training seismic volume;

training, during a training phase and based at least on the label and the training seismic volume, a machine learning model; and generating, by applying the machine learning model to the target seismic volume during a prediction phase subsequent to the training phase, a result to identify the unknown fault in the target seismic volume.

2. The method of claim 1, further comprising:

obtaining seismic data corresponding to a subterranean formation, wherein the target seismic volume comprises the seismic data;

analyzing the seismic data using the machine learning model to generate the result; and determining, based on the result, a location of the unknown fault in the subterranean formation.

3. The method of claim 1, further comprising:

extracting one or more training seismic sections from the training seismic volume wherein the plurality of patches is generated from the one or more training seismic sections, wherein the known fault is specified in the training seismic volume by the user.

4. The method of claim 1, wherein generating the label comprises:

identifying a pre-determined label of each training area in the set of training areas; and including the pre-determined label of each training area in the subset into the label of the patch, wherein said each training area in the subset comprises a plurality of pixels of the training seismic volume that are intersected by the known fault.

5. The method of claim 1, further comprising:

obtaining seismic data corresponding to a subterranean formation, wherein the target seismic volume comprises the seismic data;

analyzing the seismic data using the machine learning model to generate the result; and determining, based on the result, a location of the unknown fault in the subterranean formation, wherein applying the machine learning model to the target seismic volume comprises:

placing, for an iteration of a plurality of iterations, a sliding window over a seismic section of the seismic data, wherein the machine learning model is applied, during the iteration and using the sliding window, to the seismic section to generate a partial result, and wherein generating the result comprises:

aggregating a plurality of partial results generated during the plurality of iterations to generate a heat map, wherein the result comprises the heat map.

6. The method of claim 1, further comprising:

obtaining seismic data corresponding to a subterranean formation, wherein the target seismic volume comprises the seismic data;

wherein applying the machine learning model to the target seismic volume comprises:

placing, for an iteration of a plurality of iterations, a sliding window over a seismic section of the seismic data to generate a partial result, the partial result comprising at least one selected from a group consisting of a fault score and a fault detection mask, and wherein the machine learning model comprises at least one selected from a group consisting of:

a first convolution neural network (ConvNet) for generating the fault score; and a second ConvNet, based on at least one intermediate layer of the first ConvNet, for generating the fault detection mask.

7. The method of claim 6, wherein the at least one selected from a group consisting of the fault score and the fault detection mask is generated, during the iteration and as the partial result, for at least one selected from a group consisting of the sliding window and a prediction area of a plurality of prediction areas of the sliding window.

8. A non-transitory computer readable medium storing instructions for causing a computer processor to carry out the method according to any of claims 1-7.

9. A system for detecting an unknown fault in a target seismic volume, comprising:

a computer processor; and memory storing instructions executed by the computer processor, wherein the instructions comprise functionality to:

generate a plurality of patches from a training seismic volume that is separate from the target seismic volume, wherein a patch of the plurality of patches comprises a set of training areas, and wherein the plurality of patches comprises contiguous portions of multiple pixels of the training seismic volume;

generate a label for assigning to the patch, wherein the label represents a subset, of the set of training areas, intersected by a known fault specified by a user in the training seismic volume;

train, during a training phase and based at least on the label and the training seismic volume, a machine learning model; and generate, by applying the machine learning model to the target seismic volume during a prediction phase subsequent to the training phase, a result to identify the unknown fault in the target seismic volume;

a display device for rendering the result to identify the unknown fault; and a repository for storing the plurality of patches and the set of training areas during the training phase.

10. The system of claim 9, the instructions further comprising functionality to:

obtain seismic data corresponding to a subterranean formation, wherein the target seismic volume comprises the seismic data;

analyze the seismic data using the machine learning model to generate the result; and determine, based on the result, a location of the unknown fault in the subterranean formation.

11. The system of claim 9, the instructions further comprising functionality to:

extract one or more training seismic sections from the training seismic volume wherein the plurality of patches are generated from the one or more training seismic sections, wherein the known fault is specified in the training seismic volume by the user.

12. The system of claim 9, wherein generating the label comprises:

identifying a pre-determined label of each training area in the set of training areas; and including the pre-determined label of each training area in the subset into the label of the patch, wherein said each training area in the subset comprises a plurality of pixels of the training seismic volume that are intersected by the known fault.

13. The system of claim 9, the instructions further comprising functionality to:

obtain seismic data corresponding to a subterranean formation, wherein the target seismic volume comprises the seismic data;

analyze the seismic data using the machine learning model to generate the result; and determine, based on the result, a location of the unknown fault in the subterranean formation, wherein applying the machine learning model to the target seismic volume comprises:

placing, for an iteration of a plurality of iterations, a sliding window over a seismic section of the seismic data, wherein the machine learning model is applied, during the iteration and using the sliding window, to the seismic section to generate a partial result, and wherein generating the result comprises:

aggregating a plurality of partial results generated during the plurality of iterations to generate a heat map, wherein the result comprises the heat map.

14. The system of claim 9, the instructions further comprising functionality to:

obtain seismic data corresponding to a subterranean formation, wherein the target seismic volume comprises the seismic data;

wherein applying the machine learning model to the target seismic volume comprises:

place, for an iteration of a plurality of iterations, a sliding window over a seismic section of the seismic data to generate a partial result, the partial result comprising at least one selected from a group consisting of a fault score and a fault detection mask, and wherein the machine learning model comprises at least one selected from a group consisting of:

a first convolution neural network (ConvNet) for generating the fault score; and a second ConvNet, based on at least one intermediate layer of the first ConvNet, for generating the fault detection mask.

15. The system of claim 14, wherein the at least one selected from a group consisting of the fault score and the fault detection mask is generated, during the iteration and as the partial result, for at least one selected from a group consisting of the sliding window and a prediction area of a plurality of prediction areas of the sliding window.

* * * * *